US011313215B2

(12) United States Patent
Yi et al.

(10) Patent No.: US 11,313,215 B2
(45) Date of Patent: Apr. 26, 2022

(54) METHODS AND SYSTEMS FOR MONITORING AND OPTIMIZING RESERVOIR STIMULATION OPERATIONS

(71) Applicants: Xiaohua Yi, Houston, TX (US); Mark M. Disko, Glen Gardner, NJ (US); Limin Song, West Windsor, NJ (US); David A. Howell, Houston, TX (US)

(72) Inventors: Xiaohua Yi, Houston, TX (US); Mark M. Disko, Glen Gardner, NJ (US); Limin Song, West Windsor, NJ (US); David A. Howell, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 76 days.

(21) Appl. No.: 16/220,332

(22) Filed: Dec. 14, 2018

(65) Prior Publication Data

US 2019/0203574 A1 Jul. 4, 2019

Related U.S. Application Data

(60) Provisional application No. 62/611,655, filed on Dec. 29, 2017.

(51) Int. Cl.
| | | |
|---|---|---|
| E21B 44/00 | (2006.01) | |
| E21B 43/26 | (2006.01) | |
| E21B 47/16 | (2006.01) | |
| E21B 47/01 | (2012.01) | |
| E21B 43/12 | (2006.01) | |

(Continued)

(52) U.S. Cl.
CPC .............. *E21B 44/00* (2013.01); *E21B 43/11* (2013.01); *E21B 43/12* (2013.01); *E21B 43/26* (2013.01); *E21B 43/261* (2013.01); *E21B 47/01* (2013.01); *E21B 47/103* (2020.05); *E21B 47/107* (2020.05); *E21B 47/13* (2020.05);

(Continued)

(58) Field of Classification Search
CPC .......... E21B 43/11; E21B 43/12; E21B 43/26; E21B 43/261; E21B 44/00; E21B 47/01; E21B 47/103; E21B 47/107; E21B 47/13; E21B 47/16
See application file for complete search history.

(56) References Cited

U.S. PATENT DOCUMENTS

| | | | |
|---|---|---|---|
| 3,103,643 A | 9/1963 | Kalbfell | 340/17 |
| 3,205,477 A | 9/1965 | Kalbfell | 340/18 |

(Continued)

FOREIGN PATENT DOCUMENTS

| | | | |
|---|---|---|---|
| CN | 102733799 | 6/2014 | ............ E21B 47/16 |
| EP | 0636763 | 2/1995 | ............ E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Caroline N Butcher
(74) *Attorney, Agent, or Firm* — Leandro Arerchederra, III

(57) ABSTRACT

Provided are methods and systems for monitoring and modifying stimulation operations in a reservoir. In particular, the methods and systems utilize a downhole telemetry system, such as a network of sensors and downhole wireless communication nodes, to monitor various stimulation operations.

20 Claims, 5 Drawing Sheets

(51) Int. Cl.
*E21B 47/13* (2012.01)
*E21B 47/107* (2012.01)
*G01V 1/28* (2006.01)
*E21B 43/11* (2006.01)
*E21B 47/103* (2012.01)

(52) U.S. Cl.
CPC .............. *E21B 47/16* (2013.01); *G01V 1/288* (2013.01); *G01V 2210/1234* (2013.01)

(56) References Cited

U.S. PATENT DOCUMENTS

| | | | |
|---|---|---|---|
| 3,512,407 A | 5/1970 | Zill | 73/152 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Petersen et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,745,012 B1 | 6/2004 | Dao et al. | |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |

(56) References Cited

U.S. PATENT DOCUMENTS

| | | | |
|---|---|---|---|
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04M 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,500,076 B2 | 11/2016 | Walters et al. | |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,638,029 B2 | 5/2017 | Merino | |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0007949 A1* | 1/2002 | Tolman | E21B 33/138 166/308.1 |
| 2002/0180613 A1 | 12/2002 | Shi et al. | E21B 47/18 |
| 2002/0196743 A1 | 12/2002 | Sebastian et al. | |
| 2003/0056953 A1 | 3/2003 | Tumlin et al. | 166/298 |
| 2003/0067940 A1 | 4/2003 | Edholm | |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2006/0187755 A1 | 8/2006 | Tingley | |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0019758 A1 | 9/2007 | Bloomfield | 702/190 |
| 2007/0254604 A1 | 11/2007 | Kim | 455/88 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol et al. | 73/152.28 |
| 2010/0112631 A1 | 5/2010 | Hur et al. | 435/39 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0278432 A1 | 10/2013 | Shashoua et al. | 340/853.7 |
| 2013/0319102 A1 | 12/2013 | Riggenberg et al. | 13/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0075777 A1* | 3/2015 | Walters | E21B 47/06 166/250.1 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0285066 A1* | 10/2015 | Keller | E21B 17/1078 367/82 |

(56) References Cited

U.S. PATENT DOCUMENTS

| | | | | |
|---|---|---|---|---|
| 2015/0285937 | A1* | 10/2015 | Keller | E21B 43/26 367/82 |
| 2015/0292319 | A1 | 10/2015 | Disko et al. | E21B 47/16 |
| 2015/0292320 | A1 | 10/2015 | Lynk et al. | E21B 47/16 |
| 2015/0300159 | A1 | 10/2015 | Stiles et al. | E21B 47/16 |
| 2015/0330200 | A1 | 11/2015 | Richard et al. | E21B 44/00 |
| 2015/0337642 | A1 | 11/2015 | Spacek | E21B 44/005 |
| 2015/0354351 | A1 | 12/2015 | Morrow et al. | E21B 47/16 |
| 2015/0377016 | A1 | 12/2015 | Ahmad | E21B 47/122 |
| 2016/0010446 | A1 | 1/2016 | Logan et al. | E21B 47/122 |
| 2016/0047230 | A1 | 2/2016 | Livescu et al. | E21B 47/10 |
| 2016/0047233 | A1 | 2/2016 | Butner et al. | E21B 47/12 |
| 2016/0076363 | A1* | 3/2016 | Morrow | E21B 43/11 166/255.1 |
| 2016/0109606 | A1 | 4/2016 | Market et al. | G01V 1/50 |
| 2016/0208605 | A1* | 7/2016 | Morrow | E21B 47/14 |
| 2016/0215612 | A1 | 7/2016 | Morrow | E21B 47/122 |
| 2017/0001458 | A1 | 5/2017 | Robison et al. | E21B 47/0007 |
| 2017/0138185 | A1 | 5/2017 | Saed et al. | E21B 47/12 |
| 2017/0152741 | A1 | 6/2017 | Park et al. | E21B 47/123 |
| 2017/0167249 | A1 | 6/2017 | Lee et al. | E21B 47/14 |
| 2017/0204719 | A1 | 7/2017 | Babakhani | E21B 47/0005 |
| 2017/0254183 | A1 | 9/2017 | Vasques et al. | E21B 47/16 |
| 2017/0293044 | A1 | 10/2017 | Gilstrap et al. | G01V 1/50 |
| 2017/0314386 | A1 | 11/2017 | Orban et al. | E21B 47/091 |
| 2018/0010449 | A1 | 1/2018 | Roberson et al. | E21B 47/16 |
| 2018/0058191 | A1 | 3/2018 | Romer et al. | E21B 47/0007 |
| 2018/0058198 | A1 | 3/2018 | Ertas et al. | E21B 47/12 |
| 2018/0058202 | A1 | 3/2018 | Disko et al. | E21B 47/14 |
| 2018/0058203 | A1 | 3/2018 | Clawson et al. | E21B 47/14 |
| 2018/0058204 | A1 | 3/2018 | Clawson et al. | E21B 47/14 |
| 2018/0058205 | A1 | 3/2018 | Clawson et al. | E21B 47/14 |
| 2018/0058206 | A1 | 3/2018 | Zhang et al. | E21B 47/16 |
| 2018/0058207 | A1 | 3/2018 | Song et al. | E21B 47/16 |
| 2018/0058208 | A1 | 3/2018 | Song et al. | E21B 47/16 |
| 2018/0058209 | A1 | 3/2018 | Song et al. | E21B 47/16 |
| 2018/0066490 | A1 | 3/2018 | Kjos | E21B 33/035 |
| 2018/0066510 | A1 | 8/2018 | Walker et al. | E21B 47/011 |
| 2019/0112913 | A1 | 4/2019 | Song et al. | E21B 47/01 |
| 2019/0112915 | A1 | 4/2019 | Disko et al. | E21B 47/14 |
| 2019/0112916 | A1 | 4/2019 | Song et al. | E21B 47/14 |
| 2019/0112917 | A1 | 4/2019 | Disko et al. | E21B 47/14 |
| 2019/0112918 | A1 | 4/2019 | Yi et al. | E21B 4/16 |
| 2019/0112919 | A1 | 4/2019 | Song et al. | E21B 47/16 |
| 2019/0116085 | A1 | 4/2019 | Zhang et al. | H04L 12/24 |

FOREIGN PATENT DOCUMENTS

| | | | | |
|---|---|---|---|---|
| EP | | 1409839 | 4/2005 | E21B 43/1185 |
| EP | | 2677698 | 12/2013 | H04L 12/28 |
| EP | | 2763335 | 8/2014 | H04B 11/00 |
| TL | | WO2001/03391 | 1/2001 | |
| TL | | WO2014/100271 | 6/2014 | E21B 47/12 |
| WO | | WO2002/027139 | 4/2002 | E21B 43/12 |
| WO | | WO2004/033852 | 4/2004 | |
| WO | | WO2010/074766 | 7/2010 | A41C 1/14 |
| WO | | WO2013/079928 | 6/2013 | E21B 47/12 |
| WO | | WO2013/162506 | 10/2013 | |
| WO | | WO2014/018010 | 1/2014 | E21B 47/12 |
| WO | | WO2014/049360 | 4/2014 | E21B 47/12 |
| WO | | WO2014/134741 | 9/2014 | E21B 47/13 |
| WO | | WO2015/117060 | 8/2015 | E21B 47/12 |

OTHER PUBLICATIONS

U.S. Appl. No. 16/175,441, filed Oct. 30, 2018, Song, Limin et al.
U.S. Appl. No. 16/175,467, filed Oct. 30, 2018, Kinn, Timothy F. et al.
U.S. Appl. No. 16/175,488, filed Oct. 30, 2018, Yi, Xiaohua et al.
U.S. Appl. No. 16/220,327, filed Dec. 14, 2018, Disko, Mark M. et al.
U.S. Appl. No. 16/220,332, filed Dec. 14, 2018, Yi, Xiaohua et al.
U.S. Appl. No. 16/269,083, filed Feb. 6, 2019, Zhang, Yibing.
U.S. Appl. No. 16/267,950, filed Feb. 5, 2019, Walker, Katie M. et al.
U.S. Appl. No. 62/782,153, filed Dec. 19, 2019, Yi, Xiaohua et al.
U.S. Appl. No. 62/782,160, filed Dec. 19, 2018, Hall, Timothy J. et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data In The Indirect Dimension", pp. 8888-8909.
U.S. Department of Defense (1999) "Interoperability and Performance Standards for Medium and High Frequency Radio Systems," MIL-STD-188-141B, Mar. 1, 1999, 584 pages.
U.S. Appl. No. 15/666,334, filed Aug. 1, 2017.

* cited by examiner

METHODS AND SYSTEMS FOR MONITORING AND OPTIMIZING RESERVOIR STIMULATION OPERATIONS

CROSS REFERENCE TO RELATED APPLICATIONS

This application claims the benefit of U.S. Provisional Application Ser. No. 62/611,655, filed Dec. 29, 2017 entitled "Methods and Systems for Monitoring and Optimizing Reservoir Stimulation Operations," the disclosure of which is incorporated herein by reference in its entirety.

FIELD OF THE INVENTION

The present disclosure relates to methods and systems for monitoring and optimizing reservoir stimulation operations. In particular, the present disclosure relates to methods and systems that utilize downhole wireless networks to monitor and optimize reservoir stimulation operations, such as acidization operations and/or fracturing operations.

BACKGROUND

The production capacity of a hydrocarbon-containing subsurface formation (i.e., a hydrocarbon reservoir) may be related to a wide array of factors, including, but not limited to, the quantity of hydrocarbons present in the formation; the porosity and permeability of the formation; the pressure within the formation; the temperature within the formation; the viscosity of the hydrocarbons contained within the formation; the length of the wellbore that is exposed to the hydrocarbon-bearing strata; and the presence of water, gas, and/or other materials within the formation. Due to the variety of potential interactions among these various factors, the presence of hydrocarbons within a subsurface formation does not, in and of itself, indicate that the hydrocarbons may be economically recovered. Therefore, various techniques have been developed to stimulate the reservoir so as to increase the overall recovery of hydrocarbons from subsurface formations and/or to aid in the economic recovery of hydrocarbons from low permeability reservoirs.

For example, various chemical stimulation techniques, such as matrix acidization techniques, have been developed. In such techniques a chemical, such as an acid, that is capable of dissolving the rock matrix is injected through the well. The chemical acts to remove some of the rock material at the wellbore and to clean out and enlarge the formation pores in the near-wellbore environment.

As another example, fracturing operations have been developed which comprise injecting fracturing fluids into a formation at such high pressures and rates that the rock matrix will "part" and form a network of fractures. Various fracturing fluids, such as viscous fluids that are shear thinning, non-Newtonian gels or emulsions, may be used. Additionally, the fracturing fluids may be mixed with a proppant material, such as sand, ceramic beads, or other granular materials, to hold the fractures open after the hydraulic pressures are released.

It would be desirable to be able to monitor the effectiveness of reservoir stimulation operations, such as fracturing operations and chemical stimulation operations. For example, it would be useful to have real-time information in order to evaluate the effectiveness of the stimulation fluid as it is being used. Such information could then be used to determine whether or not a different stimulant should be used, whether the stimulation fluid should be injected at a different pressure, and/or whether or not more or less stimulation fluid should be used. As another example, many stimulation operations are completed in multi-stage operations, and may have two or more stages. Thus, it would be useful to have real-time downhole information during the stimulation operation to evaluate the performance of the stimulation in one stage before moving on to the next stage of the stimulation operation.

Thus, in reservoir stimulation operations, such as chemical stimulation operations and/or hydraulic fracturing operations, there is a need for real-time information to evaluate the performance of the stimulation operation. Further, it would be desirable to have real-time information at each stage of the stimulation operation to optimize and increase the efficiency of the stimulation operation.

Background references may include (i) U.S. Pat. Nos. 5,924,499; 6,462,672; 6,899,178; 6,909,667; 6,912,177; 7,228,902; 7,249,636; 7,477,160; 8,115,651; 9,557,434; 9,631,485; 9,759,062; 9,816,373; 9,863,222; 9,879,525; 10,100,635; and 10,132,149 (ii) U.S. Patent Application Publication Nos. 2008/0030365; 2015/0292319; 2015/0300159; 2015/0354351; 2016/0076363; and 2016/0215612; 2018/0058191; 2018/0058198; 2018/0058202; 2018/0058203; 2018/0058204; 2018/0058205; 2018/0058206; 2018/0058207; 2018/0058208; 2018/0058209; 2018/0066510; and (iii) U.S. patent application Ser. No. 15/666,334.

DETAILED DESCRIPTION OF THE DISCLOSURE

Figure 1:
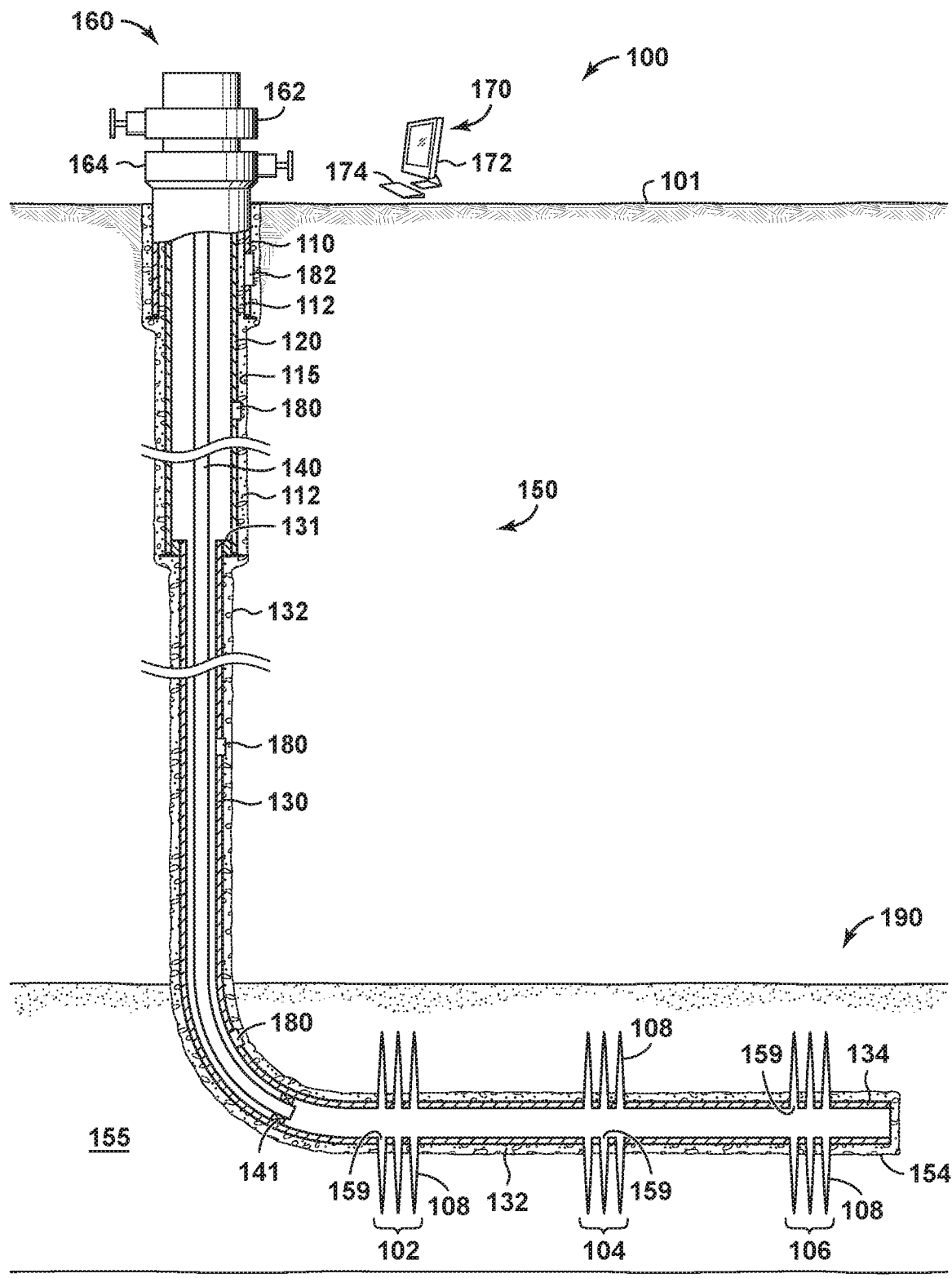
FIG. 1 is a side, cross-sectional view of an illustrative wellbore having been completed as a cased hole completion. A series of communication nodes are placed along the casing string as part of a downhole wireless telemetry system in the wellbore.

Various specific embodiments, versions, and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Terminology

Various terms as used herein are defined below. To the extent a term used in a claim is not defined below, it should be given the broadest possible definition persons in the pertinent art have given that term as reflected in at least one printed publication or issued patent.

As used herein, the term "communication node" may be used to refer to a topside communication node, an intermediate communication node, and/or a sensor communication node.

As used herein, the term "conduit" refers to a tubular member forming a physical channel through which something is conveyed. The conduit may include one or more of a pipe, a manifold, a tube or the like, or the liquid contained in the tubular member.

As used herein, the term "determining" encompasses a wide variety of actions and may include calculating, computing, processing, deriving, investigating, looking up (e.g., looking up in a table, database, or other data structure), ascertaining, and the like. Determining may also refer to resolving, selecting, choosing, establishing, and the like.

As used herein, the term "fluid" refers to gases, liquids, and combinations of gases and liquids, as well as to combinations of gases and solids where the gas is the majority component of the fluid, and combinations of liquids and solids where the liquid is the majority component of the fluid.

As used herein, the term "fluid flow measurement" refers to measuring one or more fluid flow parameters including, but not limited to, one or more of velocity, volume, pressure, resistivity, vibration, pressure drop, temperature, impedance, attenuation, density, viscosity, flow type, and the like. Such measurements can be used to determine, for example, fluid viscosity, fluid composition, phase fraction, annular distribution of flows and phases across a cross-section, flow-rate, and the like.

As used herein, the term "flow" refers to a current or stream of a fluid. Flow can be understood as the quantity of a fluid that passes a point per unit of time. Factors that affect flow can include, but are not limited to, pressure (e.g., flow is directly proportional to the pressure difference across a tube), length (e.g., flow is inversely proportional to the length of a tube), viscosity (e.g., flow is inversely proportional to the viscosity of the fluid), temperature of the fluid, fluid density, compressibility of the fluid, number of phases of the fluid (i.e., single phase or multiphase), friction, and chemical properties of the fluid.

As used herein, the term "formation" refers to any definable subsurface region. The formation may contain one or more hydrocarbon-bearing layers, one or more non-hydrocarbon containing layers, an overburden, and/or an underburden of any geologic formation.

As used herein, the term "hydrocarbon" refers to an organic compound that includes primarily, if not exclusively, the elements hydrogen and carbon. Hydrocarbons generally fall into two classes: aliphatic hydrocarbons, also known as straight chain hydrocarbons, and cyclic hydrocarbons, also known as closed ring hydrocarbons. While hydrocarbons generally comprise the elements hydrogen and carbon, in some embodiments hydrocarbons may also comprise minor amounts of other elements or compounds, such as, but not limited to, halogens, metallic elements, nitrogen, oxygen, sulfur. Examples of hydrocarbon-containing materials include any form of natural gas, oil, coal, and bitumen.

As used herein, the term "condensable hydrocarbons" refers to those hydrocarbons that condense at about 15° C. and one atmosphere of pressure. Condensable hydrocarbons may include, for example, a mixture of hydrocarbons having carbon numbers greater than 3.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (i.e., at about 20° C. and 1 atm pressure). Hydrocarbon fluids may include, for example, oil, natural gas, gas condensates, coal bed methane, shale oil, pyrolysis oil, and other hydrocarbons that are in a gaseous or liquid state.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration may include acquiring measurement data, modeling of the measurement data to form subsurface models, and determining the likely locations for hydrocarbon reservoirs within the subsurface. The measurement data may include seismic data, gravity data, electromagnetic data, geochemical data, and the like. In some embodiments, hydrocarbon exploration activities may also include drilling exploratory wells, obtaining core samples or other fluid samples, and acquiring measurement data from the core or fluid samples.

As used herein, "hydrocarbon development" refers to any activity associated with the planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. For example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon production" refers to any activity associated with extracting hydrocarbons from subsurface locations, such as a well or other opening. Hydrocarbon production activities may refer to any activity conducted to form the wellbore along with any activity in or on the well after the well is completed. Accordingly, hydrocarbon production activities includes not only primary hydrocarbon extraction, but also secondary or tertiary production techniques, such as injection of gas or liquid for increasing drive pressure, mobilizing the hydrocarbons or treating the hydrocarbons by, for example, chemicals, hydraulic fracturing the wellbore to promote increased flow, well servicing, well logging, and other well and wellbore treatments.

As used herein, "monitored section" and "monitored sections" refer to locations along the tubular members that include sensors and/or regions of interest.

As used herein, "unmonitored section" and "unmonitored sections" refer to locations along the tubular members that do not include sensors and/or are not regions of interest.

As used herein, the term "multi-zone fluid producing well" or "multi-zone production well" refers to a hydrocarbon-producing well that includes at least two production zones.

As used herein, the terms "near real-time" and "real-time" are used interchangeably and refer to the systems and methods where the time delay introduced, by automated data processing or network transmission, between the occurrence of an event and the use of the processed data, such as for display or feedback and control purposes. For example, a near-real-time or real-time display depicts an event or situation as it existed at the current time minus the processing time, as nearly the time of the live event. The time delay with regard to "near real-time" or "real-time" can be on the order of several milliseconds to several minutes, several milliseconds to several seconds, or several seconds to several minutes.

As used herein, the terms "optimal", "optimizing", "optimize", "optimality", "optimization", as well as derivatives and other forms of those terms and linguistically related words and phrases, as used herein, are not intended to be limiting in the sense of requiring the present invention to find the best solution or to make the best decision. Although a mathematically optimal solution may in fact arrive at the best of all mathematically available possibilities, real-work embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

As used herein, the term "potted" or "potting" refers to the encapsulation of electrical components with epoxy, elastomeric, silicone, or asphaltic or similar compounds for the purpose of excluding moisture or vapors. Potted components may or may not be hermetically sealed.

As used herein, the term "produced fluids" and "production fluids" refer to liquids and/or gases removed from a subsurface formation. Produced fluids may include both hydrocarbon fluids and non-hydrocarbon fluids. For example, produced fluids may include natural gas, pyrolyzed shale oil, synthesis gas, a pyrolysis product of coal, carbon dioxide, hydrogen sulfide, and water (including steam).

As used herein, the term "production casing" includes a liner string or any other tubular body fixed in a wellbore along a zone of interest.

As used herein, the term "production optimization" refers to any method, device, control device, valve, chemical, metrics, data analysis, and/or system, that can be used to improve hydrocarbon fluid production efficiency, hydrocarbon fluid production rates, hydrocarbon fluid recovery, produced gas/oil ratio, hydrocarbon fluid phase, utilization of the production plant to achieve higher throughput, water-cut, workovers, etc. Production optimization can be real-time production optimization including partial or complete automation, and/or optimization of control settings. Production optimization can be accomplished, for example, but not limited to, chemically by preventing or inhibiting scale, paraffin, asphaltene, and/or corrosion using inhibitors of one or more thereof; extending field life using for example, defoamers, emulsifiers, foamers, flow improvers, tracer dyes, and/or water clarifiers, acidizing, etc.; reinstating or improving flow performance chemically using, for example, dissolvers, cleaners, scavengers, adsorbents, water flooding, $CO_2$ flooding, etc.; mechanically, for example, but not limited to artificial lift, using, for example, pumps, including but not limited to, electric submersible pumps, gas lift, horizontal surface pumps, subsea lift systems, dewatering pump systems, geothermal pump systems, industrial pump systems, etc.; gas/water injection optimization; tubing size optimization; perforation optimization; nitrogen circulation; and the like. In certain cases, production optimization may include sealing a lost circulation zone.

Production optimization can include, but is not limited to, one or more of the following: equalizing reservoir inflow along a length of the wellbore, partially choking flow, delaying water or gas breakthrough by reducing annular velocity across a selected interval, e.g., such as the heel of a horizontal well, adjusting flow from individual zones of a production well including one or more zones of a multi-zone production well, e.g., that are over- or under-pressured, slowing water, and/or gas encroachment, and reducing the amount of bypassed reserves by equalizing a pressure drop along a length of a wellbore, e.g., so as to promote uniform flow of oil and gas through a formation so that the arrivals of water and gas are delayed and simultaneous. Production optimization can be accomplished using, for example, but not limited to, one or more of control devices including for example, ICDs that can be used to manage fluid outflow in injection wells. ICDs can be placed both in injection and producer wells; or more remotely actuated downhole valves to shut off or reduce fluid flow from one or more well production zones; outflow control devices, valves, and corresponding actuation devices, wellbore isolation devices including for example, tool seals, packers, cement plugs, bridge plugs, chemical control devices, and the like.

As used herein, the term "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, the term "sensor" includes any sensing device or gauge, such as an electrical device or gauge. The sensor may be capable of monitoring and/or detecting and/or measuring a fluid flow parameter, including for example, but not limited to pressure, pressure drop, temperature, fluid flow, fluid type, volumetric flow, fluid velocity, vibration, resistivity, impedance, attenuation, or other fluid flow data. Alternatively, the sensor may be a position or location sensor.

As used herein, the term "subsurface" refers to the region occurring below the Earth's surface. For example, the subsurface may be beneath the top surface of any mass of land at any elevation or over a range of elevations, whether above, below, or at sea level, and/or beneath the floor surface of any mass of water, whether above, below, or at sea level.

As used herein, the term "topside communication node" as used herein, refers to a communication node that can be located topside, proximate a surface. The topside communication node can be a virtual topside communication node that can be located subsurface or downhole, and can function as a topside node. The virtual topside communication node can be located, for example, at locations including but not limited to, the bottom of a vertical section, e.g., at the start of a deviated section, for example, in order to communicate with multi-zone horizontal sections of a multi-zone well. Data can be brought to the surface, e.g., to a receiver located at the surface, using, for example, but not limited to, one or more of a wireless connection, e.g., an RF wireless connection, a cable, a fiber optic cable, and the like.

As used herein, the terms "tubular member" or "tubular body" or "subsurface pipe" refer to any pipe, such as a joint or casing, a portion of a liner, a drill string, a production tubing, an injection tubing, a pup joint, a buried pipeline, underwater piping, or above-ground piping.

As used herein, the term "wellbore" refers to a hole in the subsurface made by drilling or insertion of a conduit into the subsurface. A wellbore may have a substantially circular cross section or other cross-sectional shape. As used herein, the term "well", when referring to an opening in the formation, may be used interchangeably with the term "wellbore".

As used herein, the term "well data" may include seismic data, electromagnetic data, resistivity data, gravity data, well log data, core sample data, and combinations thereof. The well data may be obtained from memory or from the equipment in the wellbore. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, and/or other suitable properties associated with the wellbore.

As used herein, the terms "zone" or "zone of interest" refer to a portion of a formation containing hydrocarbons. Zones of interest may also include formations containing brines or useable water which are to be isolated.

DESCRIPTION

The present invention is related to methods of monitoring and optimizing stimulation operations in a reservoir. In particular, the methods and systems utilize a downhole telemetry system, such as a network of sensors and downhole wireless communication nodes, to monitor the stimulation operations. For example, the system may employ a series of communication nodes spaced along a tubular member in a wellbore. The communication nodes operate to wirelessly transmit signals that represent packets of information (e.g., information about the stimulation operation), in a node-to-node manner, and to deliver the information from the subsurface to the topside. Thus, information about the stimulation operation, such as pressure data, temperature data, flow rate data, density data, vibration data, strain data, and/or acoustic data, can be collected by a variety of downhole sensors before, during, and after the stimulation operation. The information is then transmitted by the wireless communication nodes to the topside where the well operator can then use the information to optimize the stimulation operation.

For example, in one or more embodiments, the methods may comprise obtaining a first data signal from a downhole sensor where the data signal is indicative of at least one subsurface condition (such as temperature, pressure, stress, strain, etc.); transmitting the first data signal from the subsurface to the surface via a downhole wireless network; conducting a first stage of a stimulation operation (such as acidization and/or hydraulic fracturing operation); obtaining a second data signal from a downhole sensor where the data signal is indicative of at least one subsurface condition (such as temperature, pressure, stress, strain, etc.); transmitting the second data signal from the subsurface to the surface via a downhole wireless network; analyzing the data signals to determine information about the effectiveness of the stimulation operation (e.g., has there been a pressure change, has there been a temperature change, has there been a change in stress and/or strain); modifying, adjusting, and/or optimizing a stimulation plan based on the analyzed data; and producing hydrocarbons.

As another example, in some embodiments, the communication nodes may be programmed to transmit a signal (e.g., a notification associated with the stimulation operation) to a control unit (e.g., a downhole tool being utilized with the stimulation operation, a topside communication node, and/or other computer system being utilized with the stimulation operation). The notification may include the detection of a change of pressure, a change in temperature, a change in the flow rate of stimulation fluids, a change in the flow rate of hydrocarbon fluids, a change in density, a change in gammy ray emissions, a change in vibration, and/or a change in strain. The notification may then be used to adjust the timing or frequency of perforations and/or injection of stimulation fluids, adjust or stop the injection of stimulation fluids in one or more wellbore stages, change the type of stimulation fluids being used in one or more wellbore stages, and/or adjust the stimulation plan for the next stage.

Thus, the present methods and techniques may be used to monitor and optimize various stimulation operations. For example, the methods and techniques may be used to monitor acidization and fracturing operations to minimize and/or optimize the use of raw materials, such as water, acid, proppant, and/or fracturing fluids. For example, the methods and techniques may be used to improve the reliability of each stage of the stimulation operation by monitoring ball sealings and/or fluid flow patterns. For example, the methods and techniques may be used to monitor pressure, temperature, and/or vibrations before and after fracturing and thereby be used to eliminate one or more fracturing stages, and/or to increase fracturing intensity in one or more stages. For example, the methods and techniques may be used to create or modify hydrocarbon production plans for a formation by utilizing the information from one or more wellbores in the formation to create, modify, or optimize plans for drilling additional wells in the formation, well spacing, and/or drill depths.

The present methods and techniques may be further understood with reference to the Figures, which are described further below. In certain figures (such as FIG. 1), the top of the drawing page is intended to be toward the earth surface and the bottom of the drawing page toward the well bottom. While wells are commonly completed in a substantially vertical orientation, it is understood that wells may also be inclined and or horizontally completed (as shown in FIG. 1). Thus, when the descriptive terms "up" and "down" or "upper" and "lower" or similar terms are used in reference to a drawing or in the claims, they are intended to indicate relative location on the drawing page or with respect to well descriptions, and are not necessarily an absolute orientation in the ground, as at least some embodiments of the present inventions have utility no matter how the wellbore is oriented. Thus, the present inventions may have equally utility in vertically completed wells, horizontally completed wells, or in multi-lateral deviated wells as further described herein.

Figure 5:
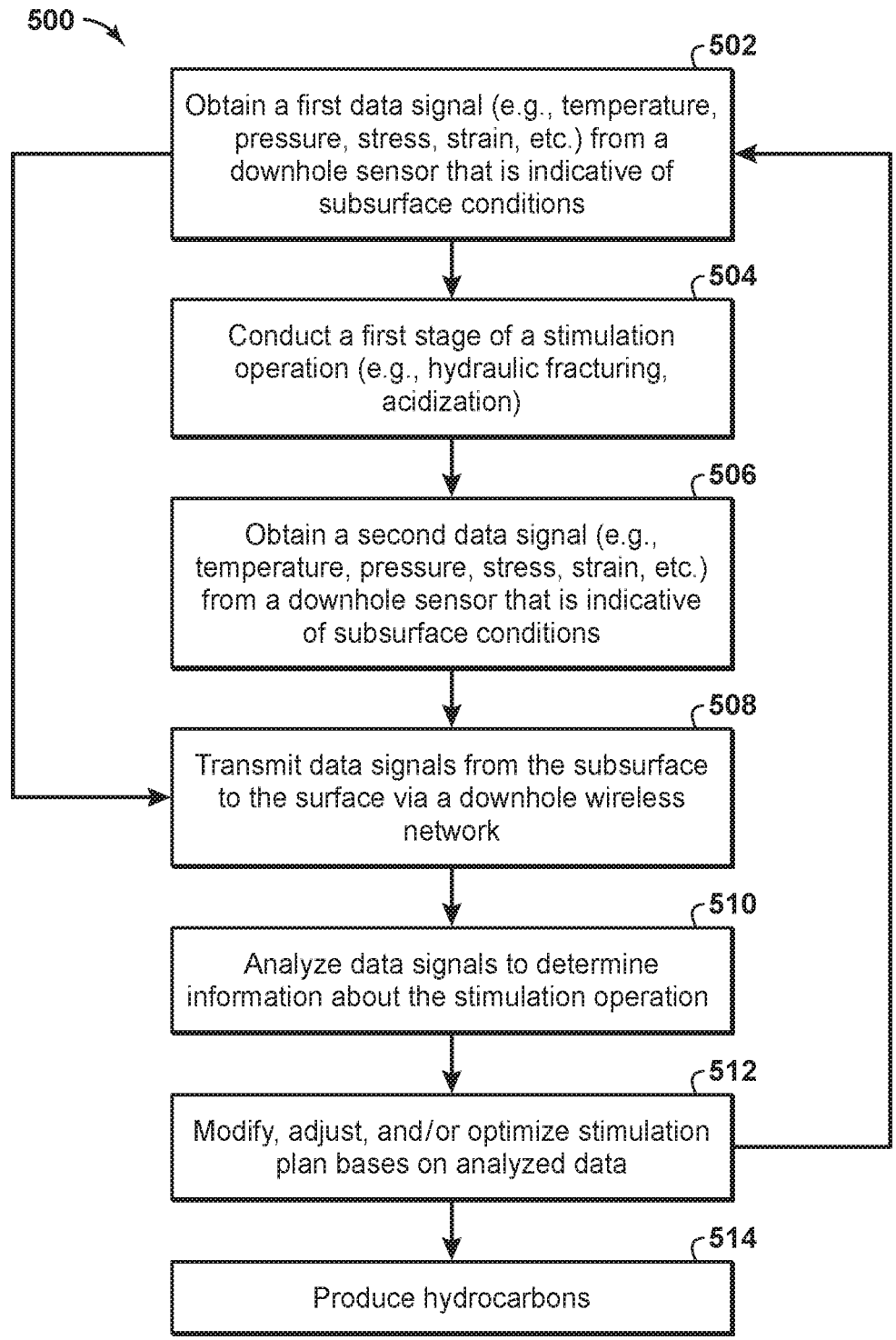
FIG. 5 is a flowchart of an illustrative embodiment of the methods described herein.

The present methods and techniques described herein may also be better appreciated with reference to flow diagrams (such as those in FIG. 5). While for purposes of simplicity of explanation, the illustrated methodologies may be shown and described as a series of blocks in FIG. 5, it is to be appreciated that the methodologies are not limited by the order of the blocks, as some blocks can occur in different orders and/or concurrently with other blocks from that shown and described. Moreover, less than all the illustrated blocks may be required to implement various embodiments of an example methodology. Blocks may be combined or separated into multiple components. Furthermore, additional and/or alternative methodologies can employ additional blocks not shown herein. While the figures illustrate various actions occurring serially, it is to be appreciated that various actions could occur in series, substantially in parallel, and/or at substantially different points in time.

FIG. 1 is a side, cross-sectional view of an illustrative well site 100. The well site 100 includes a wellbore 150 that penetrates into a subsurface formation 155. The wellbore 150 has been completed as a cased-hole completion for producing hydrocarbon fluids. The well site 100 also includes a well head 160. The well head 160 is positioned at an earth surface 101 to control and direct the flow of formation fluids from the subsurface formation 155 to the surface 101.

The well head 160 may be any arrangement of pipes or valves that receive reservoir fluids at the top of the well. In the arrangement of FIG. 1, the well head 160 is a so-called Christmas tree. A Christmas tree is typically used when the subsurface formation 155 has enough in situ pressure to drive production fluids from the formation 155, up the wellbore 150, and to the surface 101. The illustrative well head 160 includes a top valve 162 and a bottom valve 164. In some contexts, these valves are referred to as "master valves". Other valves may also be used. In a subsea context, the wellhead may also include a lower marine riser package (not shown).

It is understood that rather than using a Christmas tree, the well head 160 may alternatively include a motor (or prime mover) at the surface 101 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 160 may be configured to support a string of production tubing having a downhole electric submersible pump, a gas lift valve, or other means of artificial lift (not shown). The present invention is not limited by the configuration of production equipment at the surface unless expressly noted in the claims.

The wellbore 150 in FIG. 1 has been completed with a series of pipe strings, referred to as casing. First, a string of surface casing 110 has been cemented into the formation. Cement is shown in an annular bore 115 of the wellbore 150 around the surface casing 110. The cement is in the form of an annular sheath 112. The surface casing 110 has an upper end in sealed connection with the lower valve 164.

Next, at least one intermediate string of casing 120 is cemented into the wellbore 150. The intermediate string of casing 120 is in sealed fluid communication with the upper master valve 162. A cement sheath 112 is again shown in a bore 115 of the wellbore 150. The combination of the casing 110/120 and the cement sheath 112 in the bore 115 strengthens the wellbore 150 and facilitates the isolation of formations behind the casing 110/120.

It is understood that a wellbore 150 may, and typically will, include more than one string of intermediate casing 120. In some instances, an intermediate string of casing may be a liner. Some of the intermediate strings of casing may be only partially cemented into place, depending on regulatory requirements and the presence of migratory fluids in any adjacent strata.

Finally, a production string 130 is provided. The production string 130 is hung from the intermediate casing string 120 using a liner hanger 131. The production string 130 is a liner that is not tied back to the surface 101. Preferably, all of the production liner 130 is cemented in place. In the arrangement of FIG. 1, a cement sheath 132 is provided around the liner 130 along its entire length.

The production liner 130 has a lower end 134 that extends to an end 154 of the wellbore 150. For this reason, the wellbore 150 is said to be completed as a cased-hole well. In FIG. 1, the production liner 130 extends through a horizontal portion 190 of the formation 155. The horizontal portion 190 of the wellbore 150 typically extends for many hundreds of feet. For example the horizontal portion 190 may extend for over 250 feet, or over 1,000 feet, or even more than 5,000 feet. Extending the horizontal portion 190 of the wellbore 150 such great distances significantly increases the exposure of the formation 155 of the wellbore 150.

The formation 155 may be any hydrocarbon-bearing formation. However, in some embodiments, the formation may be a carbonate or sand formation having good consolidation but poor permeability, or may be a shale formation having low permeability. For example, in some embodiments, the formation may have a permeability of less than 100 milliDarcies ("mD"), or less than 50 mD, or less than 10 mD, or less than 1 mD. It is common for wells that are completed in so-called "tight" or "unconventional" formations to be completed horizontally as illustrated in FIG. 1. Horizontal completions not only dramatically increase exposure of the wellbore to the producing rock face, but also enable the operator to create fractures that are substantially transverse to the direction of the wellbore. Those of ordinary skill in the art may understand that a rock matrix will generally "part" in a direction that is perpendicular to the direction of least principal stress. For deeper wells, that direction is typically substantially vertical. While FIG. 1 illustrates a horizontally completed well, those skilled in the art would understand that the present methods and techniques would have equal utility in optimizing stimulation operations in other well arrangements, such as vertically completed wells or in multi-lateral deviated wells.

The wellbore 150 illustrated in FIG. 1 has been perforated 159 for a fracturing operation. That is, as part of the well completion process, the casing has been perforated, whereby lateral holes have been shot through the casing and the cement sheath surrounding the casing to allow hydrocarbon fluids to flow into the wellbore. Various techniques may be used for creating the perforations. Common techniques utilize a wellbore tool that includes a perforating gun, and optionally, a fracturing plug. The wellbore tool may be a wireline tool or may be an autonomous tool (i.e., a tool that does not require a wireline and is not mechanically tethered to equipment external to the wellbore).

For example, a bottom hole assembly ("BHA") may be run into the wellbore that includes various perforating guns and associated charges. The BHA can be controlled by the operator to cause the charges to detonate, thereby performing perforations. Thus, in some embodiments, a BHA may be deployed into the wellbore, moved up and down the wellbore allowing the operator to perforate the casing along various zones of interest, and then sequentially isolate the respective zones of interest so that fracturing fluid may be injected into the zones of interest.

As another example, in some embodiments, a process known as Just-In-Time-Perforating ("JITP") may be used, whereby an operator is able to perforate and stimulate subsurface formations at sequential intervals. JITP processes are further described in U.S. Pat. No. 6,543,538, the disclosure of which is incorporated herein by reference. A JITP process may include: using a perforating device, perforating at least one interval of one or more subterranean formations traversed by a wellbore; pumping treatment fluid through the perforations and into the selected interval without removing the perforating device from the wellbore; deploying or activating an item or substance in the wellbore to removably block further fluid flow into the treated perforations; and repeating the processes for at least one more interval of the subterranean formation.

An additional process known as the "Annular Coiled Tubing FRACturing" or ACT-Frac process may be used in conjunction with JITP processes. In ACT-Frac processes a re-settable packer is used to provide isolation between zones. Thus, JITP and ACT-Frac processes may be combined to provide techniques that: (1) enable stimulation of multiple target zones or regions via a single deployment of downhole equipment; (2) enable selective placement of each stimulation treatment for each individual zone to enhance well productivity; (3) provide diversion between zones to ensure each zone is treated per design and previously treated zones are not inadvertently damaged; and (4) allow for stimulation treatments to be pumped at high flow rates to facilitate efficient and effective stimulation. As a result, these multi-zone stimulation techniques enhance hydrocarbon recovery from subsurface formations that contain multiple stacked subsurface intervals.

Returning to FIG. 1, perforations 159 are provided in three separate zones 102, 104, and 106. Each zone may be of any length, but generally each zone may represent, for example, a length of up to about 200 feet, or up to 100 feet, or up to 50 feet. In general, the length of each zone can depend on a number of factors, such as the type of rock material in the zone, the permeability of the zone, the porosity of the zone, and/or the hydrocarbon fluid composition in the zone. As described further below, the methods and techniques described herein may be used to determine the optimal length and spacing of desired fracturing zones. While only three sets of perforations 159 are shown, it is understood that the horizontal portion 190 may have many more sets of perforations 159 in additional zones.

The wellbore 150 of FIG. 1 also has a string of injection tubing 140. The injection tubing 140 extends from the well head 160 down to the subsurface formation 155. In the arrangement of FIG. 1, the injection tubing 140 terminates proximate an upper end of the subsurface formation 155. In operation, the operator may stimulate and treat each zone 102, 104, and 106 separately and sequentially. Therefore, it is understood that the injection tubing 140 can be pulled through the horizontal portion of the wellbore 150 so that the injection fluids may be injected through the perforations 159 in zones 102, 104, and 106 separately and sequentially as desired.

A packer 141 is provided at a lower end of the injection tubing 140. The packer 141 is set when an injection fluid, such as an acid and/or fracturing fluid, is being injected through a set of perforations 159. The packer 141 will be released when it is time to move the injection tubing 140 to a different zone, or to remove it from the wellbore 150 completely.

In preparation for the production of hydrocarbons, the operator may wish to stimulate the formation 155 by conducting an acidization operation. This serves to clean out residual drilling mud along both the wall of the borehole 115 and into the near-wellbore region (the region within formation 155 close to the production casing 130). An acidization operation can be done by injecting an acid solution down the wellbore and through the perforations. The use of an acidizing solution is particularly beneficial when the formation comprises carbonate rock. Thus, in some embodiments, the operator may inject a concentrated formic acid or other acidic composition into the wellbore, and direct the fluid into selected zones of interest. The acid helps to dissolve carbonate material, thereby opening up porous channels through which hydrocarbon fluids may flow into the wellbore. In addition, the acid helps to dissolve drilling mud that may have invaded the formation. The acidization may be conducted alone or in addition to a fracturing operation, such as before or after a fracturing operation.

In preferred embodiments, the operator may wish to fracture the formation 155.

This is done by injecting a fracturing fluid under high pressure through the perforations 159 and into the formation 155. The fracturing process creates fractures 108 along the formation 155 to enhance fluid flow into the production casing 130. Where the natural or hydraulically-induced fracture plane(s) of a formation are vertical, a horizontally completed wellbore (portion 190) allows the production casing 130 to intersect multiple fracture planes. Hydraulic fracturing operations typically comprise injecting viscous fluids (usually shear thinning, non-Newtonian gels or emulsions) into the formation at such high pressures and rates that the reservoir rock fails and forms a network of fractures. The fracturing fluid is typically mixed with a granular proppant material such as sand, ceramic beads, or other granular materials. The proppant serves to hold the fracture(s) open after the hydraulic pressures are released. The combination of fractures and injected proppant helps increase the flow capacity of the treated reservoir.

It is desirable for the operator of the well to understand the effectiveness of any stimulation operation being conducted within the wellbore. To do this, a downhole telemetry system is provided at the well site 100 of FIG. 1. The telemetry system utilizes a series of communication nodes 180 arranged along the length of a conduit and/or tubular in the wellbore. In some embodiments, the communication nodes may be placed or positioned along the outer diameter of the casing strings 110, 120, and/or 130. In some embodiments, the communication nodes may be recessed within the pipe body, placed internally within the pipe body, at cross-sectional ends of the pipe joint, and/or positioned inside of the pipe through bore, and combinations thereof. For example, communication nodes may be placed on each pipe joint or casing joint, or may be placed at selected locations along every second or every third pipe joint. In some embodiments, some pipe joints receive two or more communication nodes.

Preferably, the communication node 180 is an independent wireless communication device that is designed to be attached to an external surface of the conduit or tubular member, but may also be attached to an inner surface, an end surface (e.g., on the cross-sectional end face of a connection), embedded within a wall of the conduit or tubular member, or combinations thereof. There are benefits to the use of an externally-placed communication nodes that use acoustic waves. For example, such a node will not decrease the effective inner diameter of the conduit or tubular member which could interfere with passing subsequent assemblies or tubulars through the internal bore of the conduit or tubular member. Further, installation and mechanical attachment of the communication node to the external surface can be readily assessed and adjusted.

The communication nodes are designed to attach to the wall of the conduit or tubular member, such as the casing or pipe. For example, the communication node may be pre-welded onto the wall of the conduit or tubular member. Alternatively, the communication node may be glued using an adhesive such as epoxy. In some embodiments, it may be preferred that the communication nodes are configured to be selectively attachable to and/or detachable from the conduit or tubular member by mechanical means at the well site. This may be done, for example, through the use of clamps. For example, a clamping system can be used that would allow a drilling or service company to mechanically connect/disconnect the communication nodes along the tubular body as the tubular body is being run into a wellbore.

In the arrangement of FIG. 1, the communication nodes 180 may represent a plurality of subsurface communication nodes 180. Each of the subsurface communication nodes 180 is configured to receive and then relay acoustic signals along the length of the wellbore 150, such as from the subsurface formation 155 up to the surface 101. The communication nodes 180 transmit acoustic signals. Preferably, the subsurface communication nodes 180 utilize two-way transceivers to receive and transmit signals as acoustic waves. The acoustic waves are preferably at a frequency of between about 50 kHz and 500 kHz, or from about 100 kHz to about 125 kHz.

The communication nodes also include one or more topside communication nodes 182. In FIG. 1 only one topside communication node is shown; however, in some embodiments, two or more topside communication nodes may be used (such as in the embodiments illustrated in FIG. 3). The topside communication node 182 is placed closest to the surface 101. The topside node 182 is configured to receive acoustic signals from the upper-most of the subsurface communication nodes 180. Thus, signals are delivered from the subsurface up to the topside communication node 182, in a node-to-node arrangement by the plurality of communication nodes 180. The topside communication node 182 is typically configured to receive the acoustic signals from the plurality of communication nodes 180 and convert the acoustic signals to electrical and/or optical signals which are then relayed on to a receiver 170 at the surface 101. The topside communication node 182 may be above grade (i.e., above the surface) or below grade (i.e., below the surface). In preferred embodiments, the topside communication node 182 is actually connected to the well head 160.

Figure 2A:
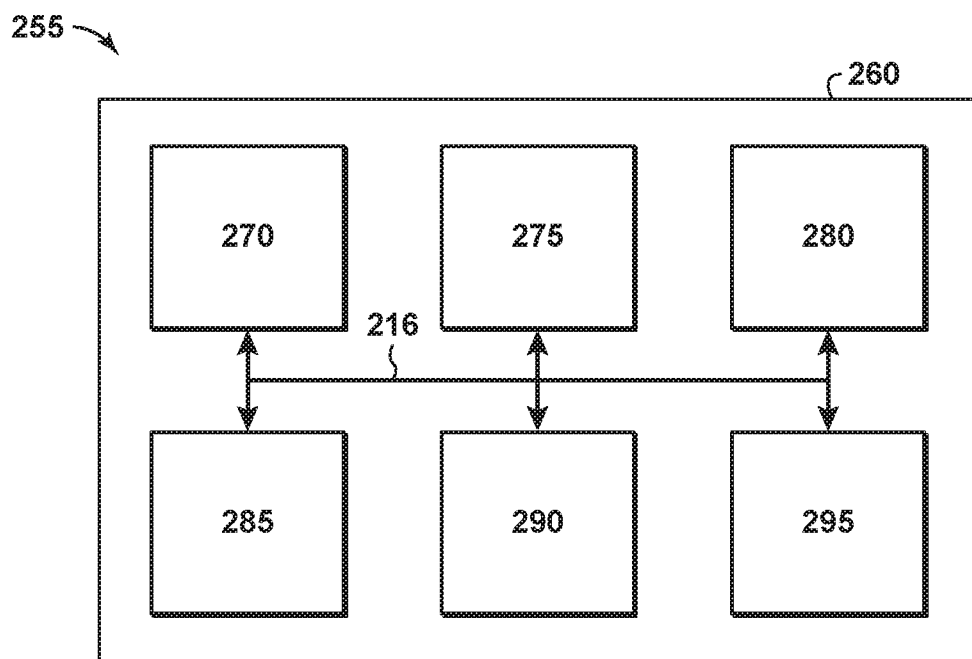
FIG. 2A is a schematic of an exemplary communication node.
Figure 2B:
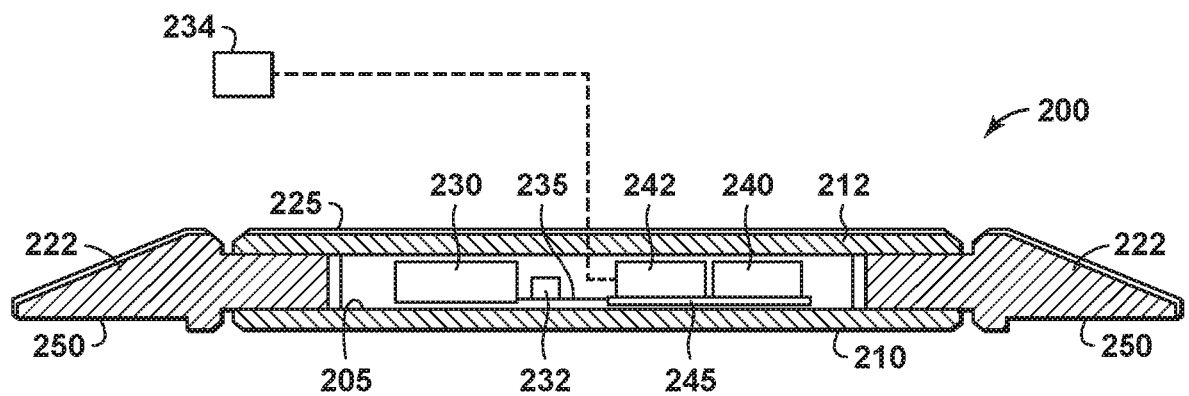
FIG. 2B is a cross-sectional view of an exemplary communication node taken along the longitudinal axis of the node.
Figure 3:
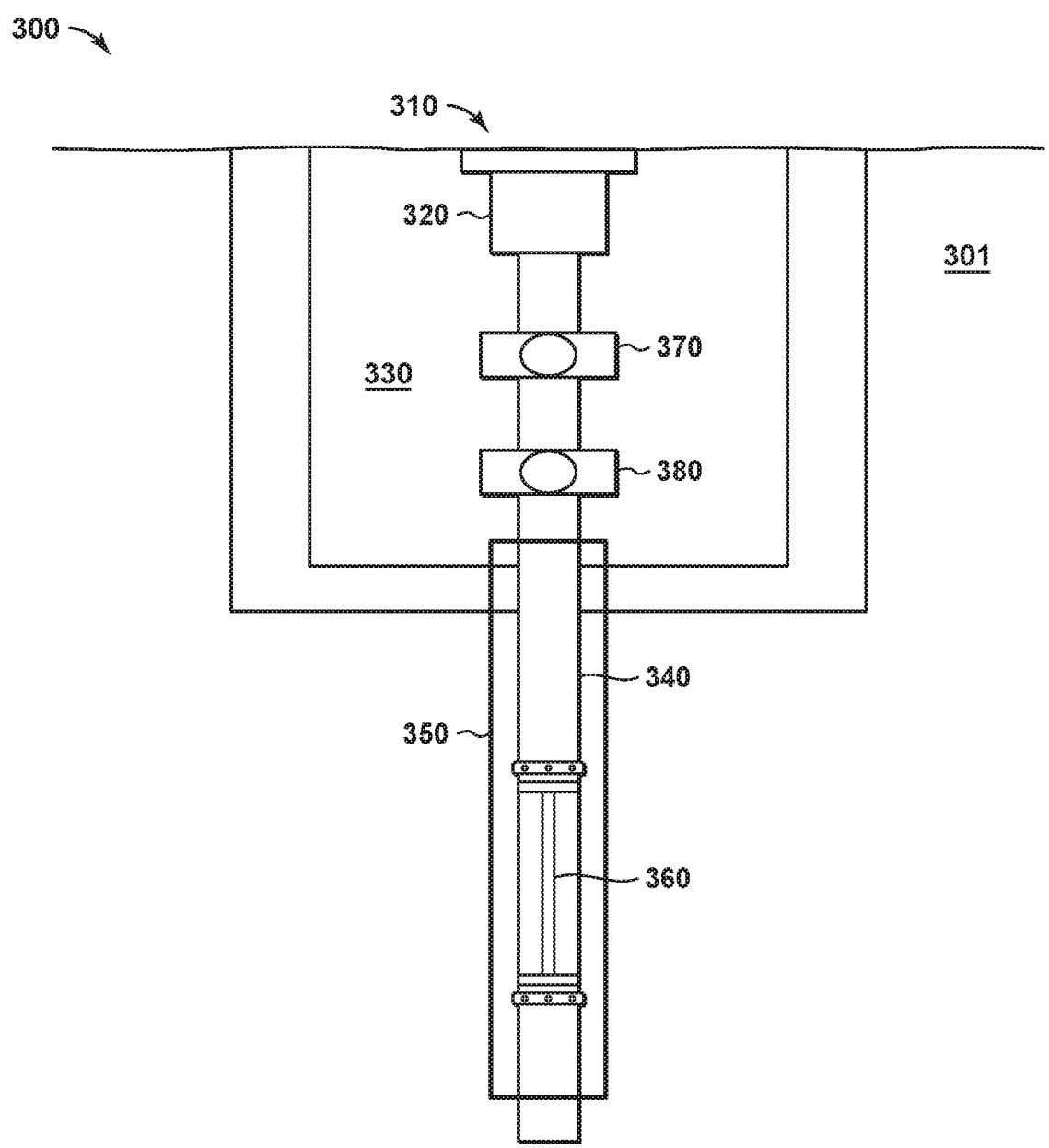
FIG. 3 is a schematic of a layout for a downhole wireless network that utilizes multiple topside nodes.

FIG. 3 provides a simplified illustration of a downhole wireless network that utilizes two topside communication nodes. In FIG. 3, a wellsite 300 is provided in which a well 310 extends from the ground level into the subsurface 301. The wellhead 320 of the well 310 is in a cellar 330 that is directly below the ground level. In addition to the wellhead 320, within the cellar 330 there are two topside communication nodes 370 and 380. The well 310 extends from the cellar further into the subsurface, and may comprise various casings and productions strings as further described with reference to FIG. 1. In FIG. 3, there is a surface conductor 350 and surface casing 340. Within the surface casing is a communication node 360. The communication node may be as describe with reference to FIGS. 1, 2A, and 2B. In FIG. 3, the two topside communication nodes are illustrated as being in separate housings 370 and 380. However, in some embodiments, the two or more topside communication nodes may be incorporated into a single housing that incorporate the combined functionality of multiple topside communication nodes.

The topside communication node(s) serve(s) as a bridge between the downhole communication nodes and the surface, and as such act(s) as a gateway to the downhole wireless network. Therefore, in some embodiments, having two or more topside communication nodes or topside communication node equivalents (i.e., multiple nodes within a single housing) in acoustic contact with the casing, conductor, wellhead, or other topside equipment as illustrated in FIG. 3 can provide significant benefits. For example, the use of multiple topside communication nodes may provide improved operational risk, such as by increasing the robustness of communications despite time-varying acoustic conditions within the wellbore; they may also provide improved network availability, such as by allowing for continuous network operation during maintenance (for example changing of batteries in a topside node); they may also provide with improved energy consumption (e.g., the more topside nodes there are, the more likely it is that there will be fewer unsuccessful attempts by the downhole network to reach a topside node); and they may provide for increased productivity, such as by allowing for the monitoring of network activities, the previewing of alternate communications settings, the identifying of nascent problems, and/or the ability to facilitate autonomous operation.

For example, the use of multiple topside communication nodes can maximize the likelihood of robust topside communications with the downhole network. That is, during well operations there can arise times where one topside communication node has an issue communicating with one or more downhole communication nodes, while the other topside communication node is able to achieve a successful communication. Often this can be due to the different placement (and thus, different acoustic connection) of the topside communication node relative to the downhole communication node, or can be due to other adverse acoustic phenomena that are time-variable, such as temperature changes and/or production flow changes.

As another example, a further benefit of the use of multiple topside communication nodes is the ability to have one node participating in the telemetry communications while the other node is able to monitor, log, and/or report on the signals being transmitted. In such a way, the non-participating node can be used to test and optimize the downhole communication nodes, and/or previous alternate communication settings before sending them through the telemetry system.

As yet another example, an additional benefit of the use of multiple topside nodes is that they can provide the ability to approach the channel capacity of the network. That is, the multiple topside communication nodes can communicate simultaneously with different downhole communication nodes and thus, increase the communication capacity of the network and more closely approach the theoretical channel capacity of the network.

Returning to FIG. 1, the well site 100 illustrates a receiver 170. The receiver 170 comprises a processor 172 that receives signals sent from the one or more topside communication nodes 182. The processor 172 may include discrete logic, any of various integrated circuit logic types, or a microprocessor. The receiver 170 may also include a screen and a keyboard 174 (either as a keypad or as part of a touchscreen). The receiver 170 may also be an embedded controller with neither screen nor keyboard which communicates with a remote computer via cellular modem, satellite, Wi-Fi, or telephone lines. In one aspect, the processor 172 is part of a multi-purpose "smart phone" having specific "apps" and wireless connectivity.

The signals may be received by the receiver 170 through a wire (not shown) such as a co-axial cable, a fiber optic cable, a USB cable, or other electrical or optical communications wire. Alternatively, the receiver 170 may receive the final signals from the topside node 182 wirelessly through modem or transceiver or other wireless communications link. In some embodiments, the receiver 170 may receive electrical signals via a so-called Class 1, Division 1 conduit, that is, a housing for a wire as defined by NFPA 497 and API 500 for operations in an electrically classified area. Alternatively, data can be transferred from the topside node to a receiver via an electromagnetic (RF) wireless connection. In some embodiments, infrared or microwave signals may also or alternatively be utilized.

The signals and data obtained from the various communication nodes may then be used by the wellbore operator to monitor and/or optimize the hydrocarbon development or hydrocarbon production operations with the wellbore. For example, the signals and data that are received may be beneficial for enhancing hydrocarbon operations, such as optimizing stimulation operations as described further below.

The communication nodes 180 in FIGS. 1 and 360 in FIG. 3 may be of various configurations, such as the communication node 255 illustrated in FIG. 2A or communication node 200 illustrated in FIG. 2B. In general, the communication nodes comprise an elongated body that supports one or more power sources and an electro-acoustic transducer. The elector-acoustic transducer is associated with a transceiver that receives acoustic signals at a first frequency, converts the received signals into a digital signal, and transmits the acoustic signal at a second frequency to the next communication node. Thus, the elector-acoustic transducer in each node allows signals to be sent node-to-node up the wellbore as acoustic waves. Beneficially, the subsurface communication nodes do not require a wire or cable to transmit data to the surface.

FIG. 2A is a diagram of an exemplary communication node 255. The communication node 255 may include a housing 260 along with a central processing unit ("CPU") 270; memory 275, which may include instructions or software to be executed by the CPU 270; one or more encoding components 285; one or more decoding components 290; a power component 295; and/or one or more sensing components 280; all of which communicate via a bus 216.

The power component 295 is generally configured to provide power to the components within the communication node 255. The power component may include one or more batteries, capacitors, super-capacitors, fuel cells, or other energy storage components. The batteries and/or fuel cells may or may not be rechargeable.

The CPU 270 may be any general-purpose CPU, although other types of architectures of CPUs may be used as long as the CPU 270 supports the operations of the communication nodes described herein. In one or more embodiments, the CPU 270 may contain may contain one or more microprocessors and may be a system on chip ("SOC"), digital signal processor ("DSP"), application specific integrated circuit ("ASIC"), and/or field programmable gate array ("FPGA"). The CPU 270 may execute the various logical instructions to operate the communication node 255. For example, the CPU may execute machine-level instructions for performing processing of the data and/or signals as described herein.

The memory 275 may include random access memory ("RAM"), such as static RAM ("SRAM"), dynamic RAM ("DRAM"), synchronous DRAM ("SDRAM"), or the like, read only memory ("ROM"), such as programmable ROM ("PROM"), erasable PROM ("EPROM"), electronically erasable PROM ("EEPROM"), or the like. In addition, the memory 275 may include NAND flash and/or NOR flash.

To manage the communications, the communication node 255 utilize the one or more encoding components 285 and one or more decoding components 290 within the housing 260. The encoding components 285, which may include one or more transducers, may be disposed within the housing 260 and may be configured to generate acoustic tones and/or to induce an acoustic tone on a tone transmission medium. The one or more decoding components 290, which may include one or more transducers, may be disposed within the housing 260 and may be configured to receive acoustic tones from the tone transmission medium. The encoding 285 and decoding 290 components may include instructions stored in memory and utilized to perform the generation of the acoustic tones or decoding of the acoustic tones along with the compression or decompression of data packets into acoustic tones. In one or more embodiments, the encoding component 285 and the decoding component 290 may utilize the same transducer.

The one or more sensing components 280 may be configured to obtain sensing data (such as measurement data) and communicate the data to the transducer for communication to the other communication nodes. By way of example, the sensing components 280 may be configured to obtain pressure measurements, temperature measurements, fluid flow measurements, vibration measurements, resistivity measurements, capacitance measurements, strain measurements, acoustics measurements, stimulation and/or hydraulic fracture properties measurements, chemicals measurements, position measurements, and/or other suitable measurements. Additional examples of suitable sensing components are described with reference to FIG. 2B.

FIG. 2B provides another exemplary configuration of a communication node 200 and shows a cross-sectional view of the communication node 200 along its longitudinal axis. The communication node 200 includes a housing 210, such as a fluid-sealed housing. The housing 210 is designed to be attached to an outer wall of a joint of a wellbore conduit or tubular member as described above. The communication nodes may be specially designed to withstand the corrosion and environmental conditions (e.g., high temperature, high pressure) of the wellbore. For example, the communication nodes may comprise steel, fluid-sealed housings for holding the electronics (e.g., batteries and/or electro-acoustic transducers). In some embodiments, the steel material is a corrosion resistant alloy. In some embodiments, it may be desirable to metallurgically match the housing of the communication node with that of the conduit or tubular member to aid in avoiding galvanic corrosion at the coupling. In some embodiments, it may be desirable to fabricate the wall of the communication node from a material having a resonance frequency compatible with the resonance frequency of the tubular body. For example, the mechanical resonance of the wall 212 may be at a frequency contained within the frequency band used for the telemetry system.

The housing 210 includes an outer wall 212. The wall 212 is dimensioned to protect internal electronics for the communication node 200 from wellbore fluids and pressure. In some embodiments, the wall 212 may have a thickness of less than 0.5 inches, such as from 0.01 inch to 0.5 inches, or from about 0.01 inch to about 0.4 inch, or from 0.1 inch, to about 0.3 inch, or be about 0.2 inches (0.51 cm) in thickness. The housing 210 optionally also has a protective outer layer 225. The protective outer layer 225 resides external to the wall 212 and provides an additional thin layer of protection for the electronics.

The communication node 200 may be of any size practical for the downhole environment. For example, the communication node may be from about 12 to 16 inches in length as it resides along the tubular body. The housing 210 of the communication node may be 8 to 10 inches in length, and each opposing shoe 250 may be 2 to 5 inches in length.

Further, the communication node may be about 1 inch in width and 1 inch in height. The base of the communication node may have a concave profile that generally matches the radius of the tubular body.

A bore 205 is formed within the wall 212. The bore 205 houses the electronics, such as a battery 230, a power supply wire 235, a transceiver 240, and a circuit board 245. The circuit board 245 will preferably include a micro-processor or electronics module that processes acoustic signals. An electro-acoustic transducer 242 is provided to convert acoustical energy to electrical energy (or vice-versa) and is coupled with outer wall 212 on the side attached to the tubular body. The transducer 242 may be in electrical communication with one or more sensors 232 and/or 234.

The sensor may be, for example, pressure sensors, temperature sensors, or microphones, or any other sensor as described herein or with reference to FIG. 2A. The sensor 232 and/or 234 sends signals to the transceiver 240 through a short electrical wire or through the printed circuit board 245. Signals from the sensor 232 are converted into acoustic signals using an electro-acoustic transducer 242, which are then sent by the transceiver 240 as part of the packet of information. For example, the sensor will measure a piece of data, such as a temperature measurement, strain measurement, acoustic noise data, geophone data, etc., the transducer then converts the piece of data (e.g., the temperature) into an acoustic waveform indicative of the data, which is then sent by the transceiver onto the next communication node.

In FIG. 2B, the sensor 232 resides within the housing 210 of the communication node 200. However, in some embodiments there may not be a sensor 232, and instead a sensor 234 may reside external to the communication node 200. The external sensor may be above or below the communication node 200 along the wellbore. In FIG. 2B, a dashed line is provided showing an extended connection between the sensor 234 and the electro-acoustic transducer 242.

While FIG. 2B illustrates sensors associated with the communication node 200, in the network illustrated in FIG. 1 it is not required that all of the communication nodes 180 possess or be associated with a sensor. That is, some communication nodes 180 may have sensors, while others may not and may simply be used to transmit information up and down the wellbore.

Returning to FIG. 2B, the communication node 200 also, optionally, includes a shoe 250. For example, the node 200 may include a pair of shoes 250 disposed at opposing ends of wall 212. Each of the shoes 250 provides a beveled face that helps prevent the node 200 from hanging up on an external tubular body or the surrounding earth formation, as the case may be, during run-in or pull-out. The shoes may have a protective outer layer 222 and an optional cushioning material under the outer layer 222.

As seen in FIG. 2B, the communication node has an independent power source 230. The independent power source 230 may be, for example, batteries or a fuel cell. Having a power source that resides within the housing of the communication nodes avoids the need for passing electrical connections through the housing, which could compromise fluid isolation.

As described above with reference to FIGS. 1, 2A, and 2B, each communication node can have the capability of sending and receiving signals, so that the downhole wireless network is able to transmit data in a node-to-node arrangement from the subsurface to the surface. In preferred embodiments, the data transmitted between the nodes is represented by acoustic waves. In some embodiments, the acoustic telemetry data transfer is accomplished using multiple frequency shift keying ("MFSK") modulation method. Although MFSK is well-suited for application in the downhole wireless networks described herein, its use is as an example and is not intended to be limiting. That is, it is known that various alternative forms of digital data modulation are available, for example, frequency shift keying ("FSK"), multi-frequency signaling, phase shift keying, pulse position modulation, and on-off keying.

Thus, signals generated by the electro-transducer within a communication node pass through the communication nodes' housing to the tubular body (such as the production or casing string), and propagate along the tubular body to other communication nodes. The data is then re-transmitted in a node-to-node arrangement up the wellbore until it reaches the topside communication node and the well operator. The re-transmitted signal represents the same sensor data originally transmitted by the first sensing communication node.

In some embodiments, the acoustic signal may be generated and received by magnetostrictive transducer(s) comprising a coil wrapped around a core as the transceiver. In some embodiments, the acoustic signal is generated and received by a piezo-electric ceramic transducer. In either case, the electrically encoded data is transformed into a sonic wave that is carried through the wall of the tubular body in the wellbore.

Acoustic telemetry along tubulars is characterized by multi-path or reverberation which persists for a period of milliseconds. As a result, a transmitted tone of a few milliseconds duration determines the dominant received frequency for a period of time of additional milliseconds. Preferably, the communication nodes determine the transmitted frequency by receiving or "listening to" the acoustic waves for a period of time corresponding to the reverberation time, which is typically much longer than the transmission time. The tone duration should be long enough that the frequency spectrum of the tone burst has negligible energy at the frequencies of neighboring tones, and the listening time must be long enough for the multipath to become substantially reduced in amplitude. For example, the tone duration may be 2 milliseconds (ms), and then the transmitter may remain silent for 48 ms before sending the next tone. The receiver, however, would listen for 50 ms (2+48) to determine each transmitted frequency, utilizing the long reverberation time to make the frequency determination more certain. Beneficially, the energy required to transmit data is reduced by transmitting for a short-period of time and exploiting the multi-path to extend the listening time during which the transmitted frequency may be detected.

For example, as described above, an MFSK modulation may be employed where each tone is selected from an alphabet of 16 tones, so that it represents 4 bits of information. With a listening time of 50 ms, for example, the data rate is 80 bits per second.

The tones are selected to be within a frequency band where the signal is detectable above ambient and electronic noise at least two nodes away from the transmitter node so that if one node fails, it can be bypassed by transmitting data directly between its nearest neighbors above and below. For example, the tones may be evenly spaced in period within a frequency band of from about 100 kHz to about 125 kHz. As another example, the tones may be evenly spaced in frequency within a frequency band of from about 100 kHz to about 125 kHz.

Preferably, the nodes employ a "frequency hopping" method where the last transmitted tone is not immediately re-used. This prevents extended reverberation from being mistaken for a second transmitted tone at the same frequency. For example, 17 tones are utilized for representing data in an MFSK modulation scheme; however, the last-used tone is excluded so that only 16 tones are actually available for section at any time.

Any extraneous noise in the signal can be moderated by using well-known conventional analog and/or digital signal processing methods. The noise removal and signal enhancement may involve conveying the acoustic signal through a signal conditioning circuit using, for example, a bandpass filter.

Returning to FIG. 1, each communication node is associated with a specific conduit or tubular member, and may be associated with a specific joint of pipe. That joint of pipe, in turn, has a known location or depth along the wellbore. Each acoustic wave as originally transmitted from a communication node will represent a packet of information. The packet will include an identification code that tells a receiver (such as receiver 170 in FIG. 1) where the signal originated, that is, which communication node 180 it came from. For example, the packet can include an amplitude value originally recorded by the communication node 180 for its associated joint of pipe. The packets of information are then relayed node-to-node from the communication nodes 180 in the subsurface to the one or more topside nodes 182 an on to the receiver 170.

As such, each signal defines a packet of information having at least an identifier (such as an acoustic amplitude value) for the subsurface communication node that originally transmitted the signal. When the signal reaches the receiver at the surface, the signal is processed. This involves identifying which communication node the signal originated from, and then determining the location of that communication node along the wellbore.

The data packet may further comprise data obtained from one or more sensors associated with the communication node. As described above, the communication node may contain or be associated with one or more sensors. The sensors may be, for example, fluid velocity measurement device, a temperature sensor, a pressure sensor, a fluid density sensor, a microphone, an ultrasound sensor, a Doppler shift sensor, a chemical sensor, an imaging sensor, an impedance sensor, an attenuation sensor, a fluid resistivity sensor, and/or other useful type of sensor. In general, the sensor sends signals to the transceiver which are converted into acoustic signals using an electro-acoustic transducer, that are then sent by the transceiver as part of the packet of information. Thus, the communication node may be configured to receive signals from the associated sensor and transmit signals indicative of readings taken by the sensor.

As described above the present methods and techniques may be useful for monitoring and optimizing stimulation operations, such as fracturing and/or acidization operations, in a reservoir. For example, FIG. 5 is an exemplary flow chart 500 in accordance with an embodiment of the present techniques. The flow chart 500 is a method for conducting a stimulation operation, such as a acidization or hydraulic fracturing operation. In general, the method may comprise obtaining data signals before and after stimulation operations, evaluating and analyzing the data signals to determine information about the stimulation operation, and using the analyzed data to modify, adjust, and/or optimize the stimulation operation.

While not illustrated in FIG. 5, the method may first comprise providing a downhole wireless network as described herein. The network may comprise a series of communication nodes that are attached with a tubular in the wellbore, where adjacent communication nodes are configured to communicate by acoustic signals transmitted through the tubular. The network further comprises at least one sensor associated with at least one communication node.

Once the downhole wireless network is installed, the method at block 502 may comprise obtaining a first data signal from a downhole sensor. Typically, the downhole sensor is associated with at least one communication node in the downhole wireless network. The data signal may comprise a measurement from the sensor and is generally indicative of at least one subsurface condition. For example, the data signal may comprise a temperature measurement, pressure measurement, stress measurement, strain measurement, etc. At block 508 the data signal is then transmitted from the subsurface to the surface via the series of communication nodes in the downhole wireless network.

At block 504 a first stage of a stimulation operation is conducted. For example, the stimulation operation may comprise perforating at least one interval of the subsurface formation that is traversed by the wellbore; pumping, introducing, and/or injecting a treatment fluid, such as an acid solution or a hydraulic fracturing fluid, into at least one interval of the wellbore; and/or deploying or activating an item or substance (such as a ball sealer) in the wellbore to block further fluid flow into an interval of the wellbore. Thus, in one or more embodiments, the stimulation operation may be an acidization treatment, and at block 504 an acid solution may be introduced and/or injected into the subsurface formation. As another example, in one or more embodiments, the stimulation operation may be a hydraulic fracturing operation, and at block 504 a perforating gun may be used to create one or more perforations in the subsurface formation and/or a hydraulic fracturing fluid may be introduced and/or injected into the subsurface formation.

At block 506 a second data signal is obtained from a downhole sensor. The downhole sensor may be the same downhole sensor that obtained the data signal at block 502 or may be a different downhole sensor. The second data signal may comprise a measurement from the sensor and is generally indicative of at least one subsurface condition. For example, the second data signal may comprise a temperature measurement, pressure measurement, stress measurement, strain measurement, etc. At block 508 the second data signal is then transmitted from the subsurface to the surface via the series of communication nodes in the downhole wireless network.

At block 510 the data signals are analyzed to determine information about the effectiveness of the stimulation operation. For example, an analysis may be conducted to determine if there has been a pressure change, a temperature change, and/or a change in stress and/or strain.

At block 512 the analyzed data is then used to modifying, adjusting, and/or optimizing the stimulation operation. For example, it may be determined that at least one condition of the stimulation operation should be chained. As an example, it may be determined that the amount of treatment fluid (e.g., acid solution and/or hydraulic fracturing fluid) being introduced into the subsurface formation needs to be increased, decreased, or stopped; that the type of treatment fluid (e.g., acid solution and/or hydraulic fracturing fluid) needs to be changed; that the pressure at which the treatment fluid (e.g., acid solution and/or hydraulic fracturing fluid) is being introduced to the subsurface formation needs to be increased or decreased. As another example, it may be determined that the stimulation operation at that interval in the wellbore was successful and that the operator may move to perform a stimulation operation at the next interval of the wellbore.

In some embodiments, the downhole sensor(s) may comprise a temperature sensor, and the data signal collected from the sensor and transmitted by the communication node may include signals representative of temperature readings taken by the temperature sensor. For example, the communication nodes may transmit a packet of information that includes (i) an identifier for the subsurface communication node originally transmitting the data, and (ii) an acoustic waveform indicative of temperature readings taken by the temperature sensor. The temperature signals from before, during, and after the stimulation operation may be analyzed to determine changes in temperature that are indicative of fracture formation activity, increased hydrocarbon fluid flow, or changes in the type of fluid flowing. In some embodiments, temperature readings from multiple downhole sensors may be transmitted to the surface. The multiple temperature readings may be averaged to determine a moving average temperature for a section of the wellbore, such as the interval being perforated and/or stimulated and/or for a particular section of casing. The average temperatures can then be compared to temperature readings from other intervals that are not being perforated and/or stimulated and/or from other sections of casing. In some embodiments, temperature readings can be integrated into subsurface maps or subsurface models to aid in the analysis of fracture formation and/or hydrocarbon flow through the formation over time, such as before, during, and/or after stimulation operations. Data from the temperature sensors may also be integrated with data from other types of sensors.

In some embodiments, the downhole sensor(s) may comprise strain gauges which can be used to determine changes in stress on the casing during and/or after the stimulation operation, and/or to identify volumetric changes near the sensor. For example, strain gauge data can be used to detect a pressure increase in the wellbore due to reservoir fluid influx through the stimulated formation. Thus, data from the strain gauges may be included as part of the packet of information sent to the receiver at the surface for analysis, and the packet of information may then include (i) an identifier for the subsurface communication node originally transmitting the data, and (ii) an acoustic waveform indicative of stress readings taken by the strain gauge. In some embodiments, stress readings from multiple downhole sensors may be transmitted to the surface. The multiple stress readings may be averaged to determine an average strain for a section of the wellbore, such as the interval being perforated and/or stimulated and/or for a particular section of casing. The average stress can then be compared to stress readings from other intervals that are not being perforated and/or stimulated and/or from other sections of casing. In some embodiments, stress readings can be integrated into subsurface maps or subsurface models to aid in the analysis of fracture formation and/or hydrocarbon flow through the formation over time, such as before, during, and/or after stimulation operations. Data from the strain gauges may also be integrated with data from other types of sensors.

In some embodiments, microphones may be placed within or associated with selected subsurface communication nodes. Passive acoustic data gathered by microphones can be used to detect wellbore fluids, especially gas, that is flowing. As gas moves through a small gap it will produce ambient noises across a broad range of frequencies that can be detected by passive acoustic sensors in the nodes. Thus, data from microphones may be included as part of the packet of information sent to the receiver at the surface for analysis, and the packet of information may then include (i) an identifier for the subsurface communication node originally transmitting the data, and (ii) an acoustic waveform indicative of acoustic data gathered by the microphone. In some embodiments, readings from multiple downhole microphones may be transmitted to the surface. The intensity and variety of acoustic frequencies measured by the multiple microphone readings may be averaged to determine an average microphone reading for a section of the wellbore, such as the interval being perforated and/or stimulated and/or for a particular section of casing. The average microphone reading can then be compared to microphone readings from other intervals that are not being perforated and/or stimulated and/or from other sections of casing. In some embodiments, microphone readings can be integrated into subsurface maps or subsurface models to aid in the analysis of fracture formation and/or hydrocarbon flow through the formation over time, such as before, during, and/or after stimulation operations. Data from the microphone sensors may also be integrated with data from other types of sensors.

In some embodiments, the downhole sensor(s) may comprise a geophone. For example, at least three communication nodes may be each associated with a geophone. The geophone "listens" for elastic waves created during a formation stimulation operation, such as a fracturing operation. These waves are converted into acoustic signals, and then sent by the transceiver in the associated communication node to the surface. Thus, the signals transmitted may represent a packet of information that includes (i) an identifier for the subsurface communication node originally transmitting the data, and (ii) an acoustic waveform indicative of elastic waves caused by movement of rock within the subsurface formation during the fracturing operations.

As with any seismic analysis process, the processing requires that certain parameters be obtained for the rock matrix within the subsurface formation beforehand. This includes an understanding of the rock type and density so that P-wave (pressure) velocity and/or S-wave (shear) velocity may be determined. The determination is generally based on existing data as obtained from well logs, core samples, or previously measured seismic data.

When the associated sensors comprise geophones, a plurality of sensors will detect elastic waves within the subsurface formation. A set of waves will be detected within a very small time frame, such as 250 microseconds. As assumption is then made that those waves within a set are indicative of the same micro-seismic event. An algorithm is applied that compares the time at which each event is heard with the known velocity v of the elastic waves. A triangulation may then be made to determine the origin of the elastic wave under analysis.

Triangulation data is accumulated at the surface. In one aspect, a binary code is assigned to a triangulation result that is indicative of azimuth, orientation, and depth. The triangulation results are then compiled so that a map of the micro-seismic events may be created. In the seismic arts, this step is referred to as "imaging". The map is viewed at the surface to determine the extent of subsurface fractures across the various zones, such as zones 102, 104, and 106 in FIG. 1.

As can be seen, various data can be gathered by the sensors including temperature measurements, strain measurements, acoustic noise data, geophone data, etc. All of this data may be integrated and considered together in evaluating a stimulation operation. In some embodiments, the evaluation may comprise comparing the amplitude value from the second data signal obtained at block 506 with a baseline vale, such as the first data signal obtained at block 502. Alternatively, the evaluation may comprise comparing the amplitude value with a baseline that is an anticipated value, where the anticipated value is determined from past experience or obtained from a database of stimulation data obtained over time.

These comparison can be used to determine various details about the stimulation operation in block 510. For example, if the data indicates that there has been no increase in hydrocarbon fluid flow after the stimulation operation, then it may be decided that further stimulation is needed for that interval of the wellbore. Alternatively, if the data indicates that there has been an increase in hydrocarbon fluid flow after the stimulation operation, then it may be decided that no further stimulation is needed for that interval. All of this information can then be used to optimize the stimulation strategy for the wellbore at block 512.

At block 514 hydrocarbon fluids may then be produced from the wellbore.

The methods and techniques described herein may be particularly useful in staged simulation operations. In staged operations, a wellbore may have multiple individual target zones identified for stimulation operations. Such target zones may represent up to about 60 meters (200 feet) of gross, vertical thickness of subterranean formation. When there are multiple or layered reservoirs to be hydraulically fractured, or a very thick hydrocarbon-bearing formation (over about 40 meters), then more complex stimulation techniques are often required to obtain treatment of the entire target formation. In this respect, the operator typically isolates various zones to ensure that each separate zone is not only perforated, but adequately fractured and treated. In this way, the operator is sure that fracturing fluid and/or stimulant is being injected through each set of perforations and into each zone of interest to effectively increase the flow capacity at each desired depth. The present methods and techniques may be utilized to efficiently monitor each zone of interest and identify when the operator should move on to the next zone of interest.

In order to isolate selected zones of interest, various diversion techniques may be employed, where "diversion" means that the injected fluid is diverted from entering one set of perforations so that the fluid primarily enters only one selected zone of interest. Various known diversion techniques include the use of: mechanical devices such as bridge plugs; packers; downhole valves; sliding sleeves; and baffle/plug combinations; ball sealers; particulates such as sand, ceramic material, proppant, salt, waxes, resins, or other compounds; chemical systems such as viscosified fluids, gelled fluids, foams, or other chemically formulated fluids; and limited entry methods. These and other methods for temporarily blocking the flow of fluids into or out of a given set of perforations are further described in U.S. Pat. No. 6,394,184, the disclosure of which is incorporated herein by reference.

Methods herein may include deploying a first perforating gun assembly into the wellbore. The first perforating gun assembly may be configured to detect a first selected zone of interest along the wellbore. Thus, as the first perforating gun assembly is pumped or otherwise falls down the wellbore, it will monitor its depth or otherwise determine when it has arrived at the first selected zone of interest. In some embodiments, it may detect when it reaches the first selected zone of interest. For example, the perforating gun assembly may detect the first selected zone of interest by matching the acoustic signature of a particular communication node within the wellbore.

The method may further include firing shots along the first zone of interest. Firing shots produces perforations. The shots penetrate the surrounding string of production casing and extend into the subsurface formation.

The method may also include providing a second perforating gun assembly. The second perforating gun assembly may be configured to detect a second selected zone of interest along the wellbore. Thus, as the second perforating gun assembly is pumped or otherwise falls through the wellbore, it will monitor its depth or otherwise determine when it has arrived at the second selected zone of interest. For example, the second perforating gun assembly may determine when it is at the second selected zone of interest by matching the acoustic signature of a particular communication node within the wellbore in the selected zone of interest. The second perforating gun assembly fires shots along the second zone of interest, creating perforations in the second zone of interest.

The method may further include injecting hydraulic fluid under high pressure to fracture the formation. The formation may be fractured by directing fluid through the perforations along the first selected zone of interest, by directing fluid through the perforations along the second zone of interest, or both.

When multiple zones of interest are being perforated and fractured, it may be desirable to employ a diversion agent as described above. For example, a fracturing plug assembly and/or ball sealers may be used. Thus, ball sealers may be pumped downhole to seal off the perforations. In some embodiments, the ball sealers may be carried downhole in a container, and released via command (from an on-board controller or from a communication node).

It may also be desirable for the operator to circulate an acid solution after perforating and fracturing each zone.

Examples of using the present methods and techniques with staged operations may be as further described with reference to FIGS. 4A and 4B.

Figure 4A:
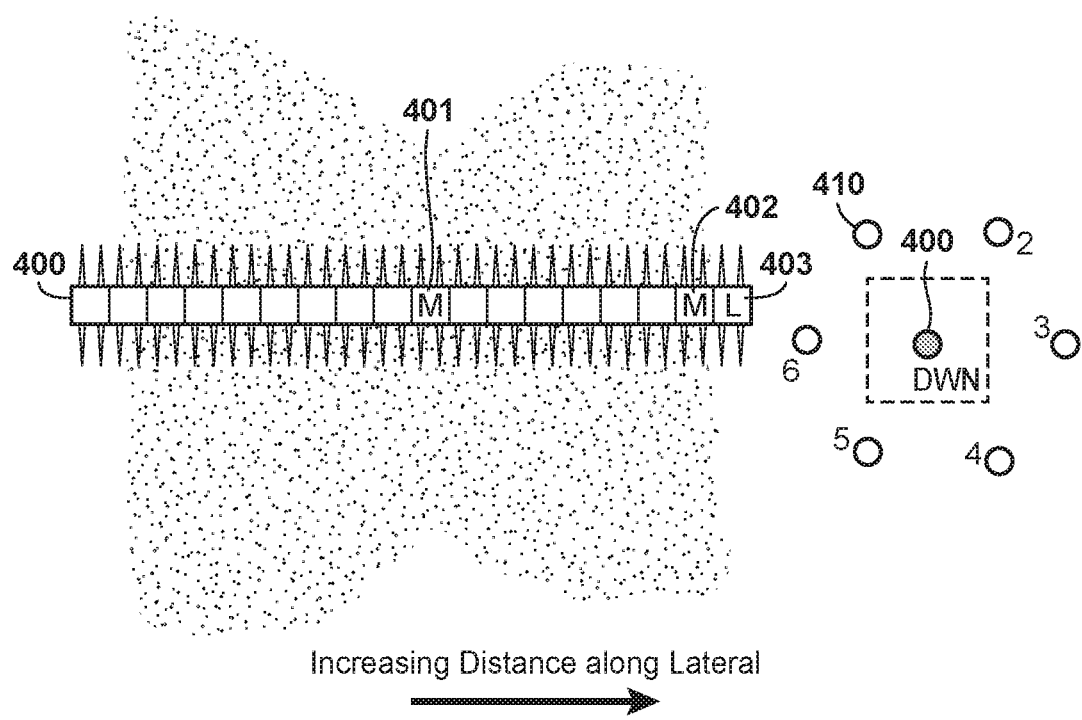
FIGS. 4A and 4B provide illustrations of monitoring stimulation operations.

FIG. 4A illustrates a single wellbore 400 traversing through a subsurface formation. As illustrated, the wellbore traverses from left to right with increasing distance along the horizontal lateral of the wellbore. Each block in the wellbore depiction illustrates a zone or interval of the wellbore in the stimulation plan. As seen in FIG. 4A, perforations have been conducted along the wellbore in each interval. Sensor data has been collected along the length of the wellbore to provide an indication of fluid flow after the stimulation operation. Sensor data from intervals 401 and 402 indicate that these sections have moderate flow, and sensor data from interval 403 indicates that this section has low inflow. Sensor data from the other intervals indicated that they have acceptable inflow levels. By reviewing the sensor data, the operator may decide that zones 401, 402, and/or 403 may need to be re-fractured to increase the flow through these zones, that different types of stimulation fluid may be needed to better target these zones, that more proppant is needed in these zones, and in such a way, the operator may optimize the stimulation operation for the wellbore 400 by optimizing stimulation in each zone of the wellbore.

Figure 4B:
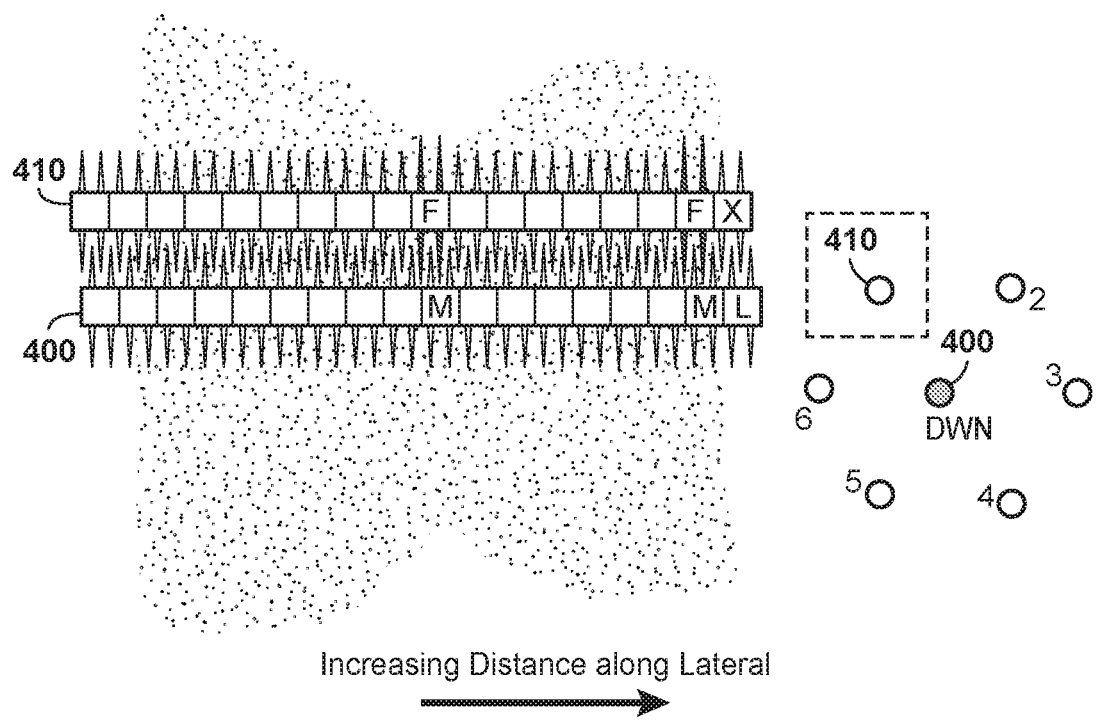

FIG. 4B illustrates the same wellbore 400 from FIG. 4A, and a new wellbore 410 that has been drilled adjacent to wellbore 400 in the same subsurface formation. As with FIG. 4A in FIG. 4B the wellbore traverses from left to right with increasing distance along the horizontal lateral of the wellbore. Each block in the wellbore depiction illustrates a zone or interval of the wellbore in the stimulation plan. In developing the stimulation plan for wellbore 410, the operator used the data from wellbore 400 to optimize the stimulation plan. For example, at sections in the wellbore 410 that correspond laterally to sections 401 and 402, the operator plans to use a different stimulation technique to increase the flow from these sections. For example, the operator could use a different (e.g., higher) pressure and/or more proppant in order to increase the flow from the wellbore 410. To further optimize the stimulation plan for wellbore 410, the operator could also choose to not perform any stimulation operation at the section of the wellbore 410 that corresponds laterally to section 403 of wellbore 400. As section 403 had very low flow in wellbore 400, the operator was able to determine that stimulating the corresponding section in wellbore 410 was unlikely to provide any producible flow, as such the operator could be more efficient in time and resources by not stimulating the corresponding section in wellbore 410.

The methods and systems described herein can be used to provide real-time information based on sensing data that was collected downhole during stimulation operations, and to allow an operator to evaluate a stimulation operation in real-time in order to adjust and optimize the stimulation operation as needed. For example, the methods and techniques can be used to collect real-time pressure data, temperature data, flow rate data, density data, gamma ray data, vibration data, strain data, and/or acoustic data, before, during, and after stimulation operations from sensors associated with one or more downhole communications nodes. The collected data is then wireless transmitted to the surface via the communications nodes for analysis, whereby the operator can use it to make operational changes to on-going stimulation operations and/or modify or optimize stimulation plans for other wellbores in the same reservoir.

Thus, in preferred embodiments, the methods described herein may be used to monitor stimulation operations to optimize the use of raw material in the stimulation operations. For example, the data feedback from a stimulation stage (e.g., pressure, temperature, vibration, pH, porosity, permeability, etc.) can be used to guide the type and amount of treatment fluid (such as acid solution and/or hydraulic fracturing fluid) that is introduced into the next stimulation stage. The sensor data can also be used to optimize the pressure and/or volume of treatment fluid being introduced into the wellbore, to ensure uniform inflow or injection rates. Additionally, the sensor data can be used to monitor fluid flow patterns and proppant flow patterns to provide real-time data about the need for additional diversion techniques (such as ball sealants, etc.).

The methods described herein may also be used to modify stimulation plans by providing the operator with real-time data that would indicate that further stimulation operations are not needed. For example, where the wellbore comprises multiple stages, by monitoring the sensor data before and after the stimulation operation in the various stages, it may be determined that a stage that is adjacent or connected to a stage that is currently being stimulated, is also being effectively stimulated. That is, while stage X has been perforated and has had treatment fluids introduced into that stage, stage Y has also experienced an increase in fluid flow after the stimulation treatment of stage X. As such, the operator can determine that stage Y does not need to be perforated and/or treated with one or more treatment fluids. As such, the stimulation plan may be optimized by skipping any stimulation operations in stage Y.

The methods described herein may also be used to determine whether a fractured stage is in a production zone. For example, after fracturing stage N, the subsurface formation may be monitored by measuring the fluid density, permittivity, conductivity, and differential pressure. Using the collected data it can be determined if the fracturing stage N is in the production zone. If it is determined to be in the production zone, then increased stimulation operations may be planned for that stage or adjacent stages to improve the production recovery rate.

The methods described herein may also be used to create an optimized stimulation plan for a grouping of wells in an area of a reservoir. For example, the methods and techniques may be used to create or modify hydrocarbon production plans for a formation by utilizing the information from one or more wellbores in the formation to create, modify, or optimize plans for drilling additional wells in the formation, well spacing, and/or drill depths. For example, the plan may be optimized by reducing the well count in the area, or to only drill in certain parts of the area based on the larger reservoir formation map generated from the collected data. Thus, using drilling data and collected data together, a reservoir formation map can be generated in 2D or 3D for the area of the reservoir. This map can be used to determine well spacing and drilling depths within the area, and can be used to guide the wells to the "sweet spot" within the area of the reservoir to optimize well productivity.

Thus, as described herein, the present invention can be used to monitor and optimize stimulation operations in a reservoir. The methods and systems can advantageously provide real-time information of downhole conditions before, during, and after stimulation operations. This information can then be used by the well operator to modify, adjust, and/or optimize the stimulation operation to improve hydrocarbon production from the subsurface. Additionally, as the methods and systems described herein utilize downhole wireless communications nodes to transmit the data to the surface, there is no need to interrupt the stimulation operations to lower a wireline tool to collect and/or transmit the data.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method for monitoring and evaluating stimulation operations, comprising:
    obtaining a first data signal from a downhole sensor that is indicative of subsurface conditions;
    conducting a first stage of a stimulation operation;
    obtaining a second data signal from the downhole sensor that is indicative of subsurface conditions after the first stage of the stimulation operation;
    transmitting the data signals from the subsurface to the surface by a downhole wireless network, wherein the downhole wireless network comprises a series of communication nodes connected to a tubular in the wellbore and wherein adjacent communication nodes are configured to communicate by acoustic signals transmitted through the tubular;

analyzing the data signals to continuously evaluate the first stage of the stimulation operation in real time without interrupting the stimulation operation to collect the data signals;

modifying or adjusting the stimulation operation based on the evaluation by changing an aspect of treatment fluid used in the stimulation operation to optimize production of hydrocarbons; and producing hydrocarbons.

2. The method of claim 1, wherein each communication node comprises a sealed housing;

an electro-acoustic transducer and associated transceiver residing within the housing configured to relay signals, with each signal representing a packet of information that comprises (i) an identifier for the subsurface communication node originally transmitting the signal and (ii) signals representative of readings taken by the downhole sensors; and an independent power source residing within the housing for providing power to the transceiver.

3. The method of claim 1, wherein the downhole wireless network comprises at least one topside communication node residing proximate the surface and a series of subsurface communication nodes along the wellbore below the topside communication nodes; and wherein at least one topside communication nodes transmits the signals from the uppermost subsurface communication node to a receiver at the surface.

4. The method of claim 1, wherein the downhole sensor comprises one or more of a fluid velocity measurement device, a temperature sensor, a pressure sensor, a fluid density sensor, a microphone, an ultrasound sensor, a Doppler shift sensor, a chemical sensor, an imaging sensor, an impedance sensor, an attenuation sensor, and a fluid resistivity sensor.

5. The method of claim 1, wherein the first data signal comprises one or more of pressure data, temperature data, flow rate data, density data, vibration data, strain data, and acoustic data.

6. The method of claim 1, wherein the second data signal comprises one or more of pressure data, temperature data, flow rate data, density data, vibration data, strain data, and acoustic data.

7. The method of claim 1, wherein the first stage of the stimulation operation comprises one or more of perforating at least one interval of the subsurface formation that is traversed by the wellbore; pumping, introducing, and/or injecting a treatment fluid into at least one interval of the wellbore; and deploying or activating an item or substance in the wellbore to block further fluid flow into an interval of the wellbore.

8. The method of claim 7, wherein the treatment fluid comprises an acid solution or a hydraulic fracturing fluid.

9. The method of claim 7, wherein the deployed or activated item or substance is a ball sealer.

10. The method of claim 1, wherein the subsurface communication nodes are spaced apart such that each joint of pipe supports at least one subsurface communication node.

11. The method of claim 1, wherein the subsurface communication nodes are spaced at an interval of from about 20 feet to about 40 feet.

12. The method of claim 1, wherein each communication node is designed to receive acoustic waves at a first frequency and then transmit the acoustic waves at a second frequency up the wellbore to the next communication node.

13. The method of claim 1, wherein the downhole sensor resides within the housings of at least one subsurface communication nodes.

14. The method of claim 1, wherein the modifying or adjusting the stimulation operation comprises increasing the amount or decreasing the amount of treatment fluid being introduced into the subsurface formation.

15. The method of claim 1, wherein the modifying or adjusting the stimulation operation comprises changing the type of treatment fluid being introduced into the subsurface formation.

16. The method of claim 1, wherein the first stage of the stimulation operation comprises injecting fluids into the wellbore under pressure and the fluids optionally comprise granular proppant material.

17. The method of claim 16, wherein the granular proppant material comprises sand and/or ceramic beads.

18. The method of claim 1, wherein the method further comprises perforating the wellbore prior to the first stage of the stimulation.

19. The method of claim 1, wherein the method further comprises conducting a second stage of the stimulation operation comprising a hydraulic fracturing operation and/or an acidization operation;

obtaining a third data signal from the downhole sensor that is indicative of subsurface conditions after the second stage of the stimulation operation;

optionally, further modifying or adjusting the stimulation operation;

and producing additional hydrocarbons.

20. The method of claim 1, wherein the downhole wireless network comprises multiple topside nodes that communicate simultaneously with different downhole communication nodes.

* * * * *